United States Patent
Kast

[11] 4,270,345
[45] Jun. 2, 1981

[54] INTEGRATED CONTROL SYSTEM FOR A GAS TURBINE ENGINE

[75] Inventor: Howard B. Kast, Fairfield, Ohio

[73] Assignee: General Electric Company, Cincinnati, Ohio

[21] Appl. No.: 942,738

[22] Filed: Sep. 15, 1978

[51] Int. Cl.³ .............................................. F02C 9/04
[52] U.S. Cl. .............................................. 60/39.28 R
[58] Field of Search .................................. 60/39.28 R

[56] References Cited
U.S. PATENT DOCUMENTS

| | | | |
|---|---|---|---|
| 4,137,707 | 2/1979 | Wanger | 60/39.28 R |
| 4,142,364 | 3/1979 | Wanger | 60/39.28 R |

Primary Examiner—Robert E. Garrett
Attorney, Agent, or Firm—Carl L. Silverman; Derek P. Lawrence

[57] ABSTRACT

An integrated control system for a gas turbine engine is provided wherein the system includes fuel control means for metering the flow of fuel to the engine, position signal generating means for providing a position signal to control the fuel control means and biasing means for providing a signal to bias the position signal during a normal mode of operation. An interfacing means is provided to automatically limit the rate of change of the position signal in order to limit the rate at which the flow of fuel to the engine may be changed during a failed mode of operation when the biasing means is inoperative. A rate limiter means is also included within the control system to automatically limit the rate of change of the position signal in order to limit the rate at which the flow of fuel to the engine may be reduced during engine deceleration.

5 Claims, 2 Drawing Figures

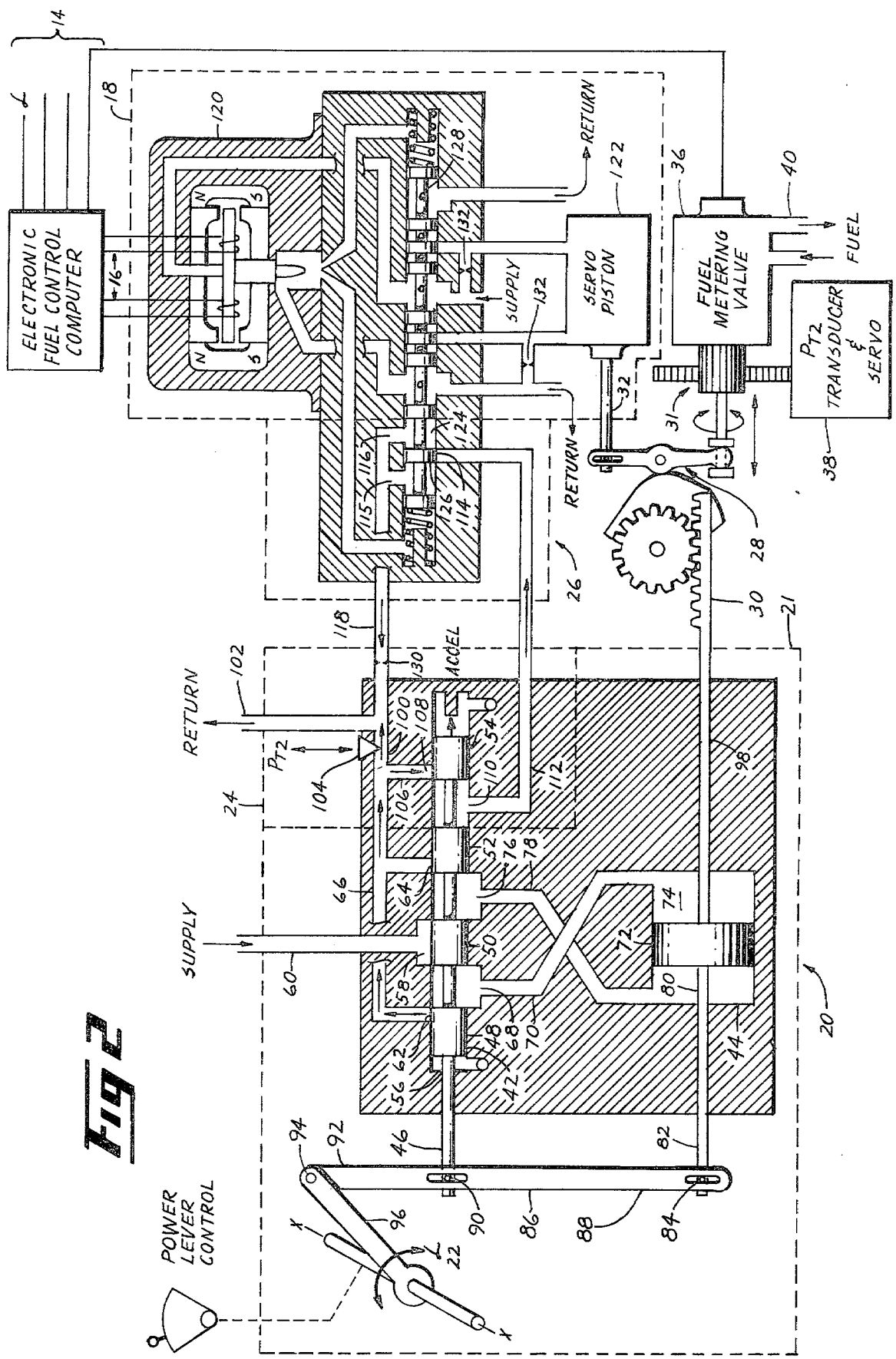

INTEGRATED CONTROL SYSTEM FOR A GAS TURBINE ENGINE

CROSS REFERENCE TO RELATED APPLICATIONS

Reference is made to U.S. Pat. No. 3,922,955 entitled "Fail-Fixed Servovalve" and to U.S. Pat. No. 4,137,707 entitled "Integrated Control System for a Gas Turbine Engine" and U.S. Pat. No. 4,142,364 entitled "Back-up Control for Gas Turbine Engine," both of which were filed on July 22, 1977 and are assigned to the assignee of the present invention.

BACKGROUND OF THE INVENTION

1. Field of the Invention

This invention relates to an integrated control system for a gas turbine engine and, more particularly, to an apparatus for interfacing between a primary control means and a backup control means in such control system, for engine deceleration rate limiting in such a control system, or both.

2. Description of the Prior Art

Full authority electronic control systems for gas turbine engines provide a number of significant advantages over conventional hydromechanical control systems. However, since full authority electronic control systems are only advancing to what might be termed a first generation level, confidence in the reliability of such electronic controls has not attained the level generally associated with the hydromechanical systems which have been in use for many years in highly refined configurations. Consequently, it is advisable to complement the electronic control system with a secondary or backup hydromechanical control system which will assure continued operation of the engine in the event the primary electrical control system exhibits a malfunction or a failure.

In a gas turbine control system having such a backup capability, it is necessary to have compatibility between the primary electronic control system and the backup hydromechanical control. In other words, the backup system must not interfere with the primary system when the latter is in control of the engine and vice versa.

It is also desirable to have a control system in which both the primary and the backup control systems are fully operable in controlling the engine during normal operation. In addition, it is necessary to have a control system in which, upon a failure of the primary electronic control system, transfer of control is accomplished in a controlled and orderly manner in which step-type changes and immediate alterations in engine operation are avoided.

Although the control system disclosed in the aforementioned U.S. Pat. No. 4,137,707 is fully capable of achieving these goals, it does so at the expense of utilizing sophisticated additional components which unnecessarily increase the weight, complexity and cost of the control system. The present invention overcomes these drawbacks by providing a simplified interfacing system in which existing control system components are adapted to automatically perform the requisite transfer functions without any significant increase in system weight, complexity or cost.

SUMMARY OF THE INVENTION

It is, therefore, an object of the present invention to provide an integrated control system for a gas turbine engine wherein, upon the failure of the primary control system, transfer of control of the engine to a backup control system is automatically accomplished in a controlled and orderly manner.

It is a further object of the present invention to provide such a control system in which such a transfer is accomplished without employing sophisticated additional components.

It is another object of the present invention to provide such a control system in which the rate of engine deceleration is automatically controlled.

Briefly stated, these and other objects, as well as advantages, which will hereinafter become apparent, are accomplished by the present invention which, in one form, provides an integrated control system for a gas turbine engine wherein the system includes fuel control means for metering the flow of fuel to the engine, position signal generating means for providing a position signal to control the fuel control means, and biasing means for providing a signal for biasing the position signal during a normal mode of operation. An interfacing means is provided to automatically limit the rate of change of the position signal in order to limit the rate at which the flow of fuel to the engine may be changed during a failed mode of operation when the biasing means is in an inoperative condition. In addition, a rate limiter means may also be included to automatically limit the rate of change of the position signal in order to limit the rate at which the flow of fuel to the engine may be reduced during engine deceleration.

BRIEF DESCRIPTION OF THE DRAWINGS

FIG. 2 is a schematic view of the control system of FIG. 1.

DESCRIPTION OF THE PREFERRED EMBODIMENT

Figure 1:
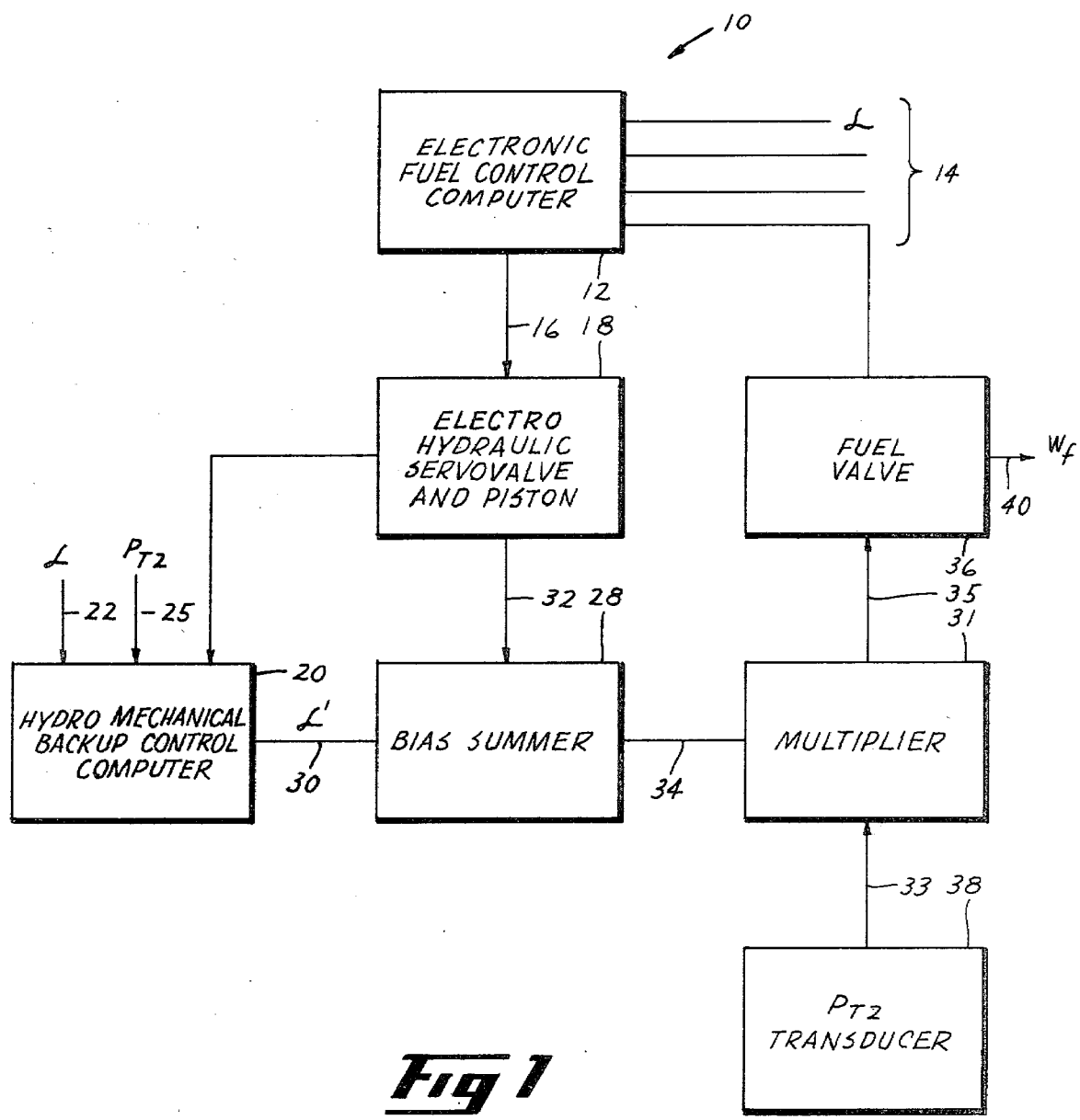
FIG. 1 is a block diagram of a gas turbine engine control system which includes the preferred embodiment of the present invention.

Referring to FIG. 1, there is presented a simplified block diagram representation of a gas turbine engine control system shown generally as 10, which employs the present invention. The control system 10 includes a primary control or biasing means in the form of an electronic fuel control computer 12 which receives a number of input signals via a plurality of conducting means, hereinafter called "lines" and shown generally as 14. The received signals are representative of ambient conditions, selected engine operating parameters and a power lever angle $\alpha$ as set by an engine operator. Typical examples of additional input signals which may be received by the fuel control computer 12 include fan inlet temperature and pressure, compressor discharge temperature and pressure, turbine inlet and discharge temperatures, fan and core engine rotational velocities, and fuel flow.

The fuel control computer 12 receives the various above-described input signals and generates an electrical bias signal which is transmitted along one or more lines shown collectively as line 16 to an electrohydraulic servovalve and piston 18. It is believed that a presentation of the specific design of the fuel control computer 12 is not necessary for an understanding of the present invention. Suffice it to say that the fuel control computer 12 electronically compares the selected engine operating parameter input signals with reference values, which are stored or calculated as a function of the ambient conditions and the power lever angle, to determine the deviation of the engine from a specific thrust level as required by the engine operator. Accordingly, the fuel control computer 12 provides an electrical bias signal via line 16 to the electrohydraulic servovalve and piston 18 for the purpose of changing the fuel flow to the engine in order to maintain the required level of thrust.

The control system 10 also includes a position signal generating or backup control computer means 20, which is operable to hydromechanically control the engine fuel flow in response to the power lever angle as set by the engine operator. A mechanical position signal 22 or $\alpha$, representative of the desired percentage of maximum possible thrust, is generated by appropriate linkage with the power lever angle selected by the engine operator and is applied to the hydromechanical backup control computer 20. The backup control computer 20 also receives a pressure signal 25 indicative of the magnitude of the total pressure ($P_{T2}$) existing at the inlet of the gas turbine engine and operates to limit the rate at which a change in the power lever angle $\alpha$ is utilized to control the engine fuel flow under certain conditions.

The control system 10 also includes a bias summer 28 which receives both a mechanical position output signal 30 or $\alpha'$ from the backup control computer 20 and a mechanical bias signal 32 from the electrohydraulic servovalve and piston 18, and provides a single mechanical fuel flow/$P_{T2}$ ratio signal 34 to a multiplier 31. The multiplier also receives a mechanical $P_{T2}$ signal 33 from a $P_{T2}$ transducer 38. The output of the multiplier 31, provides a mechanical fuel flow signal 35 to a fuel control means or fuel control valve 36. The fuel control valve 36 may be of any well-known type and a more complete explanation of its structure and operation is provided in the aforementioned U.S. patent application Ser. No. 4,137,707, the disclosure of which is incorporated herein by reference, and is believed to be unnecessary for the purposes of providing an understanding of the present invention.

During a first normal mode of operation when the electronic fuel control computer 12 is in an operative condition, the fuel flow/$P_{T2}$ ratio signal 34 is provided in response to the mechanical position signal 30 as biased by the mechanical bias signal 32. In the event of a malfunction of the electronic fuel control computer 12 or any of its associated elements or circuitry or any other occurrence which causes the electronic fuel control computer 12 to be in an inoperative condition, the bias summer 28 provides the fuel flow/$P_{T2}$ ratio signal 34 in response to the mechanical position signal 30 alone. A more complete explanation of the structure and operation of the bias summer 28 is provided in the aforementioned U.S. Pat. No. 4,137,707 and is deemed to be unnecessary for an understanding of the present invention.

Referring now to FIG. 2, a schematic of a portion of control system 10 is presented in greater detail. The hydromechanical backup control computer 20 is generally comprised of a hydraulic amplifier 21 and rate limiter means 24. A primary interface means 26, shown generally as a part of the electrohydraulic servovalve 120, interconnects the backup control computer 20 and the electronic fuel control computer 12 in a manner which will be described in greater detail below.

The hydraulic amplifier 21 is comprised of a spool-valve type servounit 42 which is in fluid communication with a power piston unit 44. The servounit 42 includes an elongated rod 46 having a plurality of increased diameter spaced apart lands 48, 50 and 52 disposed generally at one end thereof. The lands 48, 50 and 52 reside within a fluid chamber 56 having a fluid inlet port 58 which is connected through a supply conduit 60 to a source of hydraulic fluid or any other suitable fluid under pressure (not shown). The fluid chamber 56 also has a pair of outlet ports 62 and 64 connected to a fluid outlet conduit 66 which is connected to a fluid sump (not shown) in a manner which will hereinafter be described. Additionally, an outlet port 68 provides fluid communication via a conduit 70 between the fluid chamber 56 and the right side of a power piston 72. The power piston 72 is translatably disposed within a fluid chamber 74 in the power piston unit 44. An outlet port 76 also provides fluid communication via a conduit 78 between fluid chamber 56 and the left side of the power piston 72.

The power piston 72 is secured to an elongated shaft 80 extending through the power piston unit 44. A first end 82 of the shaft 80 is pivotally secured at pivot 88 to one end 88 of a power input lever linkage member 86. Linkage member 86 is also pivotally secured at an intermediate pivot 90 to the elongated rod 46 of the servounit 42. The other end 92 of linkage member 86 is pivotally secured at pivot 94 to a power lever input link 96. The power lever input link 96 rotates about an axis X—X in response to changes in the power lever setting in order to establish the mechanical position signal 22 or $\alpha$.

The second end 98 of the shaft 80 is attached to the bias summer 28 and provides the mechanical position signal 30. A detailed description of the structure and operation of the bias summer 28 is provided in the aforementioned U.S. Pat. No. 4,137,707 and is not believed to be necessary in order to provide an understanding of the present invention.

As viewed in FIG. 2, the hydraulic amplifier 21 is depicted in a steady-state position; that is, in the position occupied when the engine is operating in a steady-state condition. In the steady-state position, it can be seen that lands 48, 50 and 52 overlap and effectively block the flow of fluid through ports 62, 58 and 64 respectively, thereby isolating fluid chamber 56 from both the fluid supply conduit 60 and the fluid outlet conduit 66. Since no fluid can flow through the fluid chamber 56, the power piston 72 remains hydraulically locked in position and the position signal 30 remains constant.

In the event that the engine operator desires to change the thrust or speed of the gas turbine engine, the power lever setting is changed, thereby altering the angular position of the power lever input link 96 to change the mechanical position signal 22. By way of example, if an increase in engine thrust or speed is desired, the engine operator's movement of the power lever causes the power lever input link 96 to rotate clockwise about axis X—X as viewed in FIG. 2. Since the power piston 72 is hydraulically locked in place, the linkage member 86 rotates about pivot 84, thereby pushing the elongated rod 46 to the right as viewed in FIG. 2. The movement of the elongated rod 46 to the right establishes fluid communication between ports 58 and 68, whereby pressurized fluid from the supply conduit 60 is delivered via conduit 70, to the right side of the power piston 72. Simultaneously, fluid communication is established between outlet port 64 and port 76 whereby fluid in the chamber 74 to the left side of the power piston 72 flows through conduit 78 to the outlet conduit 66.

The application of pressurized fluid to the right side of the power piston 72 moves the power piston 72 to the left, thereby displacing fluid to the left of the power piston 72 through the outlet conduit 66. The movement of the power piston 72 also pivots the linkage member 86 clockwise about pivot 94, thereby translating the elongated rod 46 leftward until the hydraulic amplifier 21 is again in a steady-state condition, with lands 48, 50 and 52 blocking ports 62, 58 and 64 respectively. The movement of the power piston 72 to the left also moves the end 98 of rod 80 to the left, thereby changing the mechanical position signal 30 and correspondingly causing the fuel control valve 36 via the summer and the multiplier shown generally as 28 and 31 respectively to increase the flow of fuel 40 to the engine. A decrease in the flow of fuel to the engine is accomplished in a similar manner by causing the power lever input link 96 to rotate counterclockwise thereby translating the elongated rod 46 to the left, causing the power piston 72 to translate to the right.

The degree of change in the angular position of the power lever input link 96 determines the magnitude of travel of both the elongated rod 46 and the power piston 72 and therefore in part the magnitude of the increase in fuel flow 40 to the engine. The rate at which the fuel flow 40 to the engine is changed also depends in part upon the speed of travel of the power piston 72. For a given flow of pressurized fluid delivered to one side of the power piston 72, the rate at which the power piston 72 moves is dependent upon the rate at which the fluid on the other side of the power piston 72 is displaced through the outlet conduit 66. The electrical bias signals output by the fuel control computer 12 also influence the magnitude and rate of change in fuel flow to the engine.

The rate limiter means shown generally in FIG. 2 as 24, is attached to and forms a part of the hydraulic amplifier 21 and operates under certain conditions to limit the rate of change of fuel flow 40 by limiting the rate of movement of the power piston 72. As discussed above, the rate of movement of the power piston 72 may be limited by restricting the flow of fluid through the outlet conduit 66. Fluid passing through the outlet conduit 66 is returned to a fluid sump (not shown) through a pair of parallel paths hereinafter referred to as return paths A1 and A2. By the term parallel it is meant that the paths are independent, as in electrically parallel paths: it is not necessary that the paths be parallel geometrically.

The A1 fluid return path is comprised of a conduit 100 which feeds directly into a sump conduit 102. A variable restrictor 104 is disposed within conduit 100 to vary the flow area of the A1 return path proportionally with respect to the engine inlet pressure ($P_{T2}$). When $P_{T2}$ is low, as encountered at high altitudes, the A1 flow area is small and at low altitudes when $P_{T2}$ is high, the A1 flow area is large.

The A2 fluid return path is comprised of a conduit 106 which is connected to an additional inlet port 108 of the fluid chamber 56. An additional land 54 is disposed on the right end of the elongated rod 46 and the fluid chamber 56 also has an additional outlet port 110 through which the A2 return fluid passes. When the engine operator desires to increase the engine thrust or fuel flow, the above-described movement of the elongated rod 46 to the right provides fluid communication between ports 108 and 110 thereby allowing A2 return fluid to pass freely through the fluid chamber 56. When the hydraulic amplifier 21 is in a steady-state position (as shown in FIG. 2) or when the engine operator desires a decrease in the fuel flow, thereby causing the elongated rod 46 to translate to the left, the fluid communication between ports 108 and 110 is blocked by land 54, thereby blocking the A2 fluid return path. The reasons and purposes for blocking the flow of A2 return fluid in this manner will hereinafter be explained.

The A2 fluid return path continues from outlet port 110 via a conduit 112 to an inlet port 114 of the primary interface means 26. The primary interface means 26 is actually a part of an electrohydraulic servovalve 120 which is substantially comprised of a fail-fixed servovalve as shown and described in the aforementioned U.S. Pat. No. 3,922,955 which is incorporated herein by reference. The servopiston 122 also has the modifications as set forth in the aforementioned U.S. Pat. No. 4,137,707. The electrohydraulic servovalve 120 shown in FIG. 2 differs from the device depicted and described in the above-referenced application in the following respects: First, the aforementioned additional inlet port 114 has been added to provide for a flow of A2 return fluid into a fluid chamber 124 of the fail-fixed servovalve 120. Second, an additional land 126 has been added to the fail-fixed servovalve spool 128. Finally, a pair of outlet ports 115 and 116 have been added to provide for the flow of A2 return fluid out of the fluid chamber 124. The A2 return fluid path continues from outlet ports 115 and 116 via a conduit 118 and a fixed orifice 130 to the sump conduit 102.

As long as the electronic fuel control computer 12 is in an operative condition the electrohydraulic servovalve 120 receives electrical bias signals, via lines 16, thereby causing the spool 128 to translate accordingly to the left or right causing hydraulic fluid flow to the servopiston 122 which, in turn, provides a mechanical bias signal 32 to the bias summer 28. The movement of the spool 128 to either the right or left also maintains fluid communication between the A2 return fluid inlet port 110 and one of the A2 return fluid outlet ports 115 and 116, thereby allowing A2 return fluid to pass freely through the fluid chamber 124. As is set forth in detail in the aforementioned U.S. Pat. No. 4,137,707, if the fuel control computer 12 fails or becomes inoperative, the electrohydraulic servovalve 120 is designed to fail fixed: that is, the spool 128 locks in position as shown in FIG. 2, thereby causing land 126 to block the A2 return flow path. Upon failure of the fuel control computer 12 an automatic increase in fuel flow to the engine is caused by means of the small orifices 132 between the cylinder lines and supply and return lines after which the fuel flow is controlled solely by the mechanical position signal 30 from the backup control means.

OPERATION OF THE INVENTION

During a normal mode of operation when the fuel control computer 12 is in an operative condition, the backup control computer means 20 operates concurrently and compatibly with the fuel control computer 12 to regulate the flow of fuel to the engine. More specifically, the fuel control computer 12 assumes primary control by providing an electrical bias signal via lines 16 to the electrohydraulic servovalve and piston 18 which, in turn, provides a corresponding mechanical bias signal 32 to the bias summer 28. The bias summer 28 subtracts the mechanical bias signal 32 from the mechanical position signal 30 received from the hydraulic amplifier 20 and provides the mechanical fuel flow/$P_{T2}$ ratio signal 34 to the multiplier shown generally as 31.

If the engine operator advances the power lever to increase the engine thrust or speed, the rate of change of the mechanical position signal 30 is rapid since an advance of the power lever causes the elongated rod 46 to translate to the right, thereby allowing the A2 return fluid to flow through the hydraulic amplifier 21. Since the fuel control computer 12 is in an operative condition, the A2 return fluid also flows through the electrohydraulic servovalve 120, thereby completing the A2 path to the fluid sump. Thus, the fluid displaced by the power piston 72 flows to the fluid sump through both the A1 and A2 return paths limited only by the variable restrictor 104 and fixed restrictor 130, thereby allowing the mechanical position signal 30 to change at a rapid rate. As is explained in the aforementioned U.S. Pat. No. 4,137,707, the fuel control computer 12 utilizes the electrical bias signals to limit increases in actual fuel flow to a rate whereby the engine may be accelerated to the new speed desired by the operator without encountering engine stall or overtemperature.

If, during a normal mode of operation, the engine operator desires a decrease in engine thrust or speed, the rate of change of the mechanical position signal 30 is automatically slow or limited since the elongated rod 46 translates to the left, thereby completing blocking the flow of the A2 return fluid. Thus, the fluid displaced by the power piston 72 flows to the fluid sump only through the A1 return path as limited by the variable restrictor 104. As is also explained in detail in the aforementioned U.S. Pat. No. 4,137,707, since the engine is being decelerated, engine stall and overtemperature are not significant, thus, the fuel control computer 12 provides an electrical bias signal which reduces the fuel flow to the engine at a faster rate than the rate of reduction scheduled by the hydraulic amplifier 21 and the rate limiter means 24.

In the event that the fuel control computer 12 becomes inoperative, no electrical bias signal is received by the electrohydraulic servovalve 120 and it fails in the fixed position as described in detail in the aforementioned U.S. patent and as shown in FIG. 2. In the failed position, land 126 of spool 128 of the electrohydraulic servovalve 120 automatically blocks the A2 return fluid flow path. Therefore, all fluid displaced by the power piston 72 during either acceleration or deceleration, flows only through the A1 return fluid flow path. The variable restrictor 104 thus acts as the only limit upon rate of change of mechanical position signal 30 and correspondingly the rate of change of fuel flow.

From the foregoing it can be seen that the present invention provides an interface for an integrated primary/backup control system which operates to automatically limit the rate of change of fuel flow in the event the primary control means becomes inoperable as well as a rate limiter means to limit the rate of change of fuel flow during engine deceleration. This result is accomplished without the need for sophisticated additional components. While the preferred embodiment of the present invention has been described and depicted, it will be appreciated by those skilled in the art that modifications, substitutions and changes may be made thereto without departing from the broad inventive concepts. For example, although the control system as described controls engine fuel flow, it could readily be adapted as is shown in the aforementioned U.S. Pat. No. 4,137,707 to control variable engine geometry such as stator positions, either alone or in combination with fuel flow. It is to be understood, therefore, that this invention is not limited to the particular embodiment disclosed, but it is intended to cover all such modifications which are within the spirit and scope of this invention as claimed.

What is claimed is:

1. An improved integrated control system for a gas turbine engine which includes:
   fuel control means for metering the flow of fuel to said engine;
   position signal generating means comprising a backup control means for providing a position signal to said fuel control means, said fuel control means operating to meter the flow of fuel to said engine in accordance with said position signal;
   biasing means comprising a primary control means for providing a bias signal for biasing said position signal during a normal mode of operation when said biasing means is in an operative condition;
   wherein the improvement comprises:
   said backup control means comprises a servounit which is connected to a source of fluid under pressure and is in fluid communication with a power piston, said power piston moving in response to fluid received from said servounit to provide said position signal, said servounit also including a plurality of independent fluid return conduits;
   said primary control means includes a fail-fixed servovalve connected in series with one or more of said independent fluid return conduits;
   interfacing means for automatically limiting the rate of change of said position signal to limit the rate at which the flow of fuel to said engine may be changed during a failed mode of operation when said biasing means is in an inoperative condition with said servovalve acting as said interfacing means when said primary control means is in said inoperative condition to block one or more of said independent fluid return conduits in order to limit the rate of fluid return flow out of said servounit, thereby limiting the rate of movement of said power piston.

2. An improved integrated control system for a gas turbine engine which includes:
   fuel control means for metering the flow of fuel to said engine; and
   control means for providing a position signal to said fuel control means, said fuel control means operating to meter the flow of fuel to said engine in accordance with said position signal
   wherein the improvement comprises:
   said control means comprises a servounit of the spool valve type which includes an elongated rod having a plurality of spaced apart lands with said servounit being connected to a source of fluid under pressure and in fluid communication with a power piston, said power piston moving in response to fluid received from said servounit to provide said position signal, said servounit also including a plurality of independent fluid return conduits; and
   rate limiter means for limiting the rate of change of said position signal to limit the rate at which the flow of fuel to said engine may be reduced with one or more of said lands operating as said rate limiter means to block one or more of said independent fluid return conduits to limit the rate of movement of said power piston.

3. An improved integrated control system for a gas turbine engine which includes:
fuel control means for metering the flow of fuel to said engine;
position signal generating means comprising a backup control means for providing a position signal to said fuel control means, said fuel control means operating to meter the flow of fuel to said engine in accordance with said position signal;
biasing means comprising a primary control means for providing a bias signal for biasing said position signal during a normal mode of operation when said biasing means is in an operative condition;
wherein the improvement comprises:
interfacing means for automatically limiting the rate of change of said position signal to limit the rate at which the flow of fuel to said engine may be changed during a failed mode of operation when said biasing means is in an inoperative condition with said automatic limiting being accomplished without the need for an activating electrical control signal.

4. An improved integrated control system for a gas turbine engine which includes:
fuel control means for metering the flow of fuel to said engine;
position signal generating means comprising a backup control means for providing a position signal to said fuel control means, said fuel control means operating to meter the flow of fuel to said engine in accordance with said position signal;
biasing means comprising a primary control means for providing a bias signal for biasing said position signal during a normal mode of operation when said biasing means is in an operative condition;
wherein the improvement comprises:
interfacing means for automatically limiting the rate of change of said position signal to limit the rate at which the flow of fuel to said engine may be changed during a failed mode of operation when said biasing means is in an inoperative condition;
said backup control means comprises a servounit of the spool valve type which includes an elongated rod having a plurality of spaced apart lands with said servounit being connected to a source of fluid under pressure and in fluid communication with a power piston, said power piston moving in response to fluid received from said servounit to provide said position signal, said servounit also including a plurality of independent fluid outlet conduits; and
rate limiter means for limiting the rate of change of said position signal to limit the rate at which the flow of fuel to said engine may be reduced during engine deceleration with one or more of said lands operating as said rate limiter means to block one or more of said independent fluid return conduits in order to limit the rate of fluid flow out of said servounit, thereby reducing the rate of movement of said power piston to limit the rate at which the flow of fuel to said engine may be reduced.

5. The apparatus as set forth in claims 1, 4 or 2 in which said independent fluid return conduits are in parallel relation.

* * * * *